United States Patent [19]

Baseden

[11] 4,303,697

[45] Dec. 1, 1981

[54] PROCESS FOR IMPROVING THE ADHESION OF PAINT TO POLYOLEFIN SURFACES

[75] Inventor: Gerald A. Baseden, Wilmington, Del.

[73] Assignee: E. I. Du Pont de Nemours and Company, Wilmington, Del.

[21] Appl. No.: 178,733

[22] Filed: Aug. 18, 1980

Related U.S. Application Data

[63] Continuation-in-part of Ser. No. 39,946, May 17, 1979, abandoned.

[51] Int. Cl.³ ................................................ B05D 3/06
[52] U.S. Cl. ............................... 427/54.1; 204/159.17; 428/520
[58] Field of Search .................... 427/54.1; 204/159.17

[56] References Cited

U.S. PATENT DOCUMENTS

| | | | |
|---|---|---|---|
| 2,873,241 | 2/1959 | Strzyzewski et al. | 427/54.1 |
| 3,551,235 | 12/1970 | Bassemir et al. | 427/54.1 |
| 3,551,311 | 12/1970 | Nass et al. | 427/54.1 |
| 3,579,485 | 5/1971 | Folzenlogen et al. | |
| 3,619,246 | 11/1971 | Bragole | 427/54.1 |
| 3,661,614 | 5/1972 | Bassemir et al. | 427/54.1 |

FOREIGN PATENT DOCUMENTS 974928 9/1975 Canada.

Primary Examiner—John H. Newsome

[57] ABSTRACT

Surfaces of articles made of polyethylene, polypropylene, crystalline dipolymers of ethylene with propylene, blends of two or more of the above, and blends of any of the above with elastomeric ethylene/propylene copolymers or with EPDM copolymers are prepared for painting by priming with a chlorinated polymeric material selected from a chlorinated polypropylene and chlorinated polypropylene containing carboxylic anhydride groups, and exposing to ultraviolet radiation. This treatment improves both dry and wet adhesion of paint to surfaces of articles made of single polyolefins as well as of their blends with elastomeric copolymers in which the latter constitute at most 50% of the total polymer.

9 Claims, No Drawings

PROCESS FOR IMPROVING THE ADHESION OF PAINT TO POLYOLEFIN SURFACES

CROSS-REFERENCE TO RELATED APPLICATION

This is a continuation-in-part of my application Ser. No. 039,946, filed May 17, 1979 now abandoned.

BACKGROUND OF THE INVENTION

This invention relates to a process for modifying the surface of articles made of certain polyolefins and polyolefin blends to improve adhesion of paints and similar protective or decorative coatings thereto.

Polyolefins such as polyethylene, polypropylene, and ethylene/propylene copolymers have found many applications, for example, in household articles, toys, appliances, furniture, and automobile parts. It is often desirable to apply to the exterior surface of a polyolefin article a protective or decorative coating, especially paint, but it is necessary to first prepare the surface either by mechanical treatment or by use of a primer. It is known to use as primers various ultraviolet sensitizers, for example, benzophenone or trichloroethylene, then to irradiate the surface with ultraviolet light. It is also known to use primers which do not require ultraviolet irradiation, for example, a chlorinated polyolefin sold by Eastman Kodak Company.

While most prior art methods of chemical surface modification are adequate for certain polyolefin materials, they are not entirely satisfactory for others. Thus, it is easier to prime the surface of a vulcanized EPDM copolymer than of polypropylene or polyethylene. EPDM copolymers are either copolymers of ethylene, propylene, and a nonconjugated diene having only one polymerizable double bond or copolymers of ethylene, propylene, a diene having only one polymerizable double bond, and a nonconjugated diene in which both double bonds are polymerizable.

Since it is frequently preferred to use a polymer blend, rather than a single polymer, in fabricating a polyolefin article, the selection of a suitable primer will thus depend on the composition of the blend. For example, blends of polypropylene with EPDM copolymers have been found to be particularly useful for automobile bumpers, bumper inserts, and automobile trim. Because those automobile parts are exposed to varying atmospheric conditions, to rain water, and to hot water in automatic car wash installations, good adhesion of paint is particularly difficult to achieve. If the paint finish blisters of peels, the part is unsatisfactory both to the car manufacturer and to the car owner. Accordingly, there is great need in the industry for a primer that would provide good paint adhesion, under dry and wet conditions, to surfaces or articles made from a polyolefin or polyolefin blend in which polyethylene or polypropylene is the only or the predominating polymer.

SUMMARY OF THE INVENTION

According to the present invention, there is now provided a process for preparing for painting the surface of an article made of polyolefin selected from:
(1) polyethylene, polypropylene, and crystalline dipolymers of ethylene and propylene;
(2) blends of at least two members of the group recited in (1) above; and
(3) blends of at least one member of the group recited in (1) above with at least one elastomer selected from the class of ethylene/propylene dipolymers and EPDM copolymers in which the total amount of elastomeric polymers is at most about 50 weight percent of the final polymer blend;

said process comprising the steps of:
(a) cleaning said surface;
(b) priming the cleaned surface with a thin layer of a chlorinated polymeric material selected from:
  (1) chlorinated polypropylene containing about 5-25 weight percent of chlorine and having a number average molecular weight of about 5,000-50,000, and
  (2) chlorinated polypropylene containing carboxylic anhydride groups, and about 5-25 weight percent of chlorine and having a number average molecular weight of about 5,000-50,000; and
(c) exposing the primed surface to ultraviolet radiation.

Paint subsequently applied to the primed surface shows improved adhesion.

DETAILED DESCRIPTION OF THE INVENTION

The polyolefins to which the surface modification process of the present invention is applicable are well known to the art and are readily available commercially from one or more sources. There is abundant patent literature which discloses processes for making both high and low density polyethylene; isotactic and syndiotactic polypropylene; both crystalline and elastomeric ethylene/propylene dipolymers; and EPDM copolymers, both tri- and tetrapolymers. These patents are well known to a polymer chemist. The preferred crystalline ethylene/propylene dipolymers are the hard, impact-resistant grades, which contain up to 22 weight percent ethylene. The preferred elastomeric ethylene/propylene copolymers contain about 30-75% ethylene, 60-90% propylene, and 0-10% nonconjugated diene or dienes. These copolymers are rubbery and substantially amorphous. Nonconjugated dienes having only one polymerizable double bond, which can be copolymerized with ethylene and propylene to EPDM copolymers have about 6-22 carbon atoms and include, for example, acyclic dienes such as: 1,4-hexadiene, 1,9-octadiene, 11-ethyl-1,11-tridecadiene, 9-ethyl-1,9-undecadiene, 8-ethyl-1,8-decadiene, 10-ethyl-1,9-dodecadiene, 12-ethyl-1, 12-tetradecadiene, 13-butyl-1,12-heptadecadiene, and 15-ethyl-1,15-heptadecadiene; and cyclic dienes such as: dicyclopentadiene, 5-butenyl-2-norbornene, 5-ethylidene-2-norbornene, 5-methylene-2-norbornene, 2-ethyl-2,5-norbornadiene, and 1,5-cyclooctadienes. The preferred diene in this category is 1,4-hexadiene. Prepresentative nonconjugated dienes in which both double bonds are polymerizable are 1,5-hexadiene, 1,4-pentadiene, and 2,5-norbornadiene.

Curable homopolymers and copolymers are normally cured before the surface modification process of the present invention is carried out. Curing methods are well known in the art. Thus, amorphous polyethylene, polypropylene, and ethylene/propylene dipolymers are curable with conventional peroxide systems. The EPDM copolymers, whether tripolymers or tetrapolymers, can be cured either with a peroxide or with sulfur by methods well known in the art. Crystalline polyethylene and polypropylene ordinarily are not cured.

Chlorinated polypropylene can be readily prepared by solution, melt, or solid polymer chlorination at moderate to high temperatures according to well-known techniques as reviewed, for example, in Raff and Doak, "Crystalline Olefin Polymers II," p. 239, Interscience Publishers, New York, N.Y., 1964.

Chlorinated polypropylene containing carboxylic anhydride groups can be prepared by grafting maleic anhydride on polypropylene and chlorinating the graft copolymer, according to the teachings of U.S. Pat. No. 3,579,485 to Folzenlogen et al. (assigned to Eastman Kodak Company), which are herein incorporated by reference. As indicated in this patent, conventional high molecular weight polypropylene is first degraded under controlled conditions to a material having a melt viscosity range of about 100–5,000 cps at 190° C. and an inherent viscosity of about 0.1 to 0.5 measured in tetralin at 145° C. Grafting of maleic anhydride takes place at about 150°–300° C., preferably in the presence of a free radical generator. Chlorination of the graft copolymer can be carried out, for example, as shown in Example 9 of the above-mentioned U.S. Pat. No. 3,759,485. Chlorinated polymeric materials suitable in the process of the present invention are available commercially from Eastman Chemical Products, Rochester, N.Y.

For practical application of the chlorinated polymeric material, it is preferred to use a solution of the chlorinated polymeric material in a suitable solvent, for example, an aromatic hydrocarbon, a chlorinated hydrocarbon, or a solvent blend. Alicyclic hydrocarbons can be used in solvent blends and are preferred because of their low toxicity and ready availability at a low cost. Tetrahydrofuran may also be used. Suitable alicyclic hydrocarbon diluents include cyclohexane and methylcyclohexane. While chlorinated hydrocarbons, both aliphatic and aromatic, can be used, they are less desirable on account of their greater toxicity. The concentration of the chlorinated polymeric material in the solution may be about 0.1 to 5.0% by weight but 1.0–2.5% is preferred.

The polyolefin surface to be treated according to the process of this invention must be thoroughly clean. Cleaning can be accomplished by scrubbing with water and soap or detergent or by solvent-cleaning with, for example, a hydrocarbon, a chlorinated hydrocarbon, a ketone, or another suitable solvent. The cleaned surface is then allowed to dry, optionally at an elevated temperature. A solution of chlorinated polymeric material is then applied to the clean surface, and the solvent is allowed to evaporate, again optionally at an elevated temperature. Finally, the primed surface is exposed to ultraviolet radiation. It has been found that the primer is the most effective when it is deposited on the polyolefin surface in an amount of about 0.017–1.08 mg of dry material per $cm^2$. Particularly good paint adhesion is obtained when the amount of dry primer is about 0.03–0.2 mg/$cm^2$. The term "dry" means solvent-free.

Most commercial sources of ultraviolet radiation can be used in the process of the present invention, although the preferred source consists of a quartz-jacketed mercury vapor lamp. For the purposes of this invention the term "ultraviolet radiation" is intended to mean all that radiation emitted by the ultraviolet source within the wave length range of 200–400 nm. It is important to control the amount of such ultraviolet radiation used: too little radiation will not adequately improve paint adhesion, while excessive ultraviolet radiation will cause degradation of the exposed surface and again harm paint adhesion. Measurement of the amount of ultraviolet exposure is best achieved by using an ultraviolet photometer (such as Model IL600, from International Light Inc.) equipped with a 365 nm narrow band pass filter. From the intensity of radiation at 365 nm, as determined by the photometer, and the spectral energy distribution of the lamp, as supplied by the lamp manufacturer, the total ultraviolet energy used in the wave length range 200–400 nm can be determined. In the process of this invention, it is preferred to adjust the radiation exposure time so that the radiation energy received by the surface is about 0.10–6.0 J/$cm^2$. The optimum radiation energy range is 0.2–3.0 J/$cm^2$. The surface that has been primed with chlorinated polymeric material and exposed to ultraviolet radiation is now ready for painting. The quality of paint adhesion can be determined in both dry and wet adhesion tests, as explained below in the Examples.

The polyolefins and polyolefin blends which can be advantageously treated according to the process of this invention can be either uncompounded or compounded in the usual manner, for example, with carbon black and other fillers, process oils, plasticizers, and similar ingredients. However, the proportions of individual polyolefins in the blends recited in the Summary of the Invention and in the claims are based on the polyolefins themselves, not on the weight of a compounded polyolefin composition.

This invention is now illustrated by the following examples of certain preferred embodiments thereof, where all parts, proportions and percentages are by weight unless otherwise indicated.

Polymer melt flow rate was determined according to ASTM D-1238-73 (Condition L).

I. EXAMPLES

Example 1

A filled polyolefin composition was prepared by mixing the following ingredients in an internal mixer for two minutes at 150° C.

|  | Parts |
| --- | --- |
| EPDM Rubber[(1)] | 31.7 |
| Polypropylene[(2)] | 38.7 |
| HAF Black | 29.6 |

Plaques of the above thermoplastic composition were injection-molded at 232° C. Two plaques were cleaned in a power wash cycle and primed as follows: On both plaques the primer consisted of a light spray coat of a 1% solution in toluene of chlorinated polypropylene containing carboxylic anhydride groups. This material had a number average molecular weight of about 15,000 and contained about 15 weight percent of chlorine. The dry weight of the chlorinated polymeric material deposited on each plaque was 0.095 mg/$cm^2$. After the primer had been applied and the plaques allowed to dry, one of the two plaques was additionally exposed to UV radiation from a medium pressure quartz-jacketed mercury vapor lamp, radiating power at the rate of about 80 watts per cm of lamp length. The exposure was adjusted so that the plaque received all the radiation accompanying an irradiation of 0.33 J/$cm^2$ at the wavelength of 365 nm, which was equivalent to a total UV energy exposure of 0.9 J/$cm^2$ in the 200–400 nm range. The other plaque received no UV radiation. Both plaques were then painted with a flexible alkyd enamel (Durethane ® 100, PPG Industries) to give a dry film thickness of 22 μm. The enamel was baked for 40 minutes at 120° C.

The plaques were tested as follows:

(i) Dry adhesion. A lattice pattern of cuts was made through the paint over a small test area of the sample. The lattice consisted of a series of parallel cuts about 1.5 mm apart containing two sets of cuts at right angles to each other and a third set diagonally to the first two. Reinforced adhesive tape was then pressed into the paint over the area of the lattice cuts, then quickly ripped off. Adhesion was rated from 100% to 0% according to the area of paint left adherent to the substrate.

(ii) Wet adhesion. The center of the plaque was scribed with an "X". The plaque was then placed about 5 cm below and at an angle of 45° to the nozzle of a steam generator, so that the nozzle, capable of delivering wet steam at about 0.4 MPa gauge pressure, was aimed at the center of the "X". The test consisted of measuring the time taken for the steam blast to initiate a paint adhesion failure at the center of the "X" and was run for a maximum of 180 seconds. This test is particularly useful for evaluating the ability of painted parts on the outside of cars to withstand exposure to an automatic car wash. The following results were obtained:

|  | No UV | With UV |
|---|---|---|
| Dry Adhesion: | 90% | 100% |
| Wet Adhesion: | 10 s | >180 s |

EXAMPLE 2

Plaques were prepared and tested as in Example 1, except that the following thermoplastic composition was used:

|  | Parts |
|---|---|
| EPDM Rubber[(1)] | 50 |
| Polypropylene[(2)] | 50 |

[(1)]Partially crystalline copolymer of 18 mol % propylene/81 mol % ethylene/1 mol % 1,4-hexadiene having a Mooney viscosity (ML$_{2+10}$) = 60 at 121° C.
[(2)]Same as in Example 1.

Results:

|  | No UV | With UV |
|---|---|---|
| Dry Adhesion: | 95% | 100% |
| Wet Adhesion: | 50 s | >180 s |

EXAMPLE 3

Plaques were prepared and tested as in Example 1, except that the following thermoplastic composition was used:

|  | Parts |
|---|---|
| Propylene Homopolymer[(1)] | 99 |
| HAF Black | 1 |

[(1)]4 melt flow rate

Test results were as follows:

|  | No UV | With UV |
|---|---|---|
| Dry Adhesion: | 10% | 10% |
| Wet Adhesion: | 10 s | 20 s |

EXAMPLE 4

Plaques were prepared and tested as in Example 1, except that the plaques were baked for 3 hours at 105° C. and that the following composition was used:

|  | Parts |
|---|---|
| EPDM Rubber of Example 2 | 20 |
| High Density Polyethylene (melt index 2.8) | 80 |

Test results were as follows:

|  | No UV | With UV |
|---|---|---|
| Dry Adhesion: | 0 | 99% |
| Wet Adhesion: | <5 s | >180 s |

EXAMPLE 5

This example compares the use of two different commercial chlorinated polymeric materials, namely, Primer 1, the same as used in Example 1, and Primer 2, a 1% solution in toluene of chlorinated polypropylene having a number average molecular weight of about 15,000 and a chlorine content of about 15%. Plaques having the same composition as described in Example 1 were cleaned in a power wash cycle and then lightly spray-coated with one or the other of the two chlorinated polymeric materials as 1% solutions in toluene. After drying, the plaques were exposed to UV radiation as described in Example 1. Two coats of flexible alkyd paint were applied: about 18 μm of a neutral grey base coat, which was baked for 20 minutes at 115° C., and about 45 μm of a white top coat, which was baked for 40 minutes at 115° C.

The following test results were obtained:

| Chlorinated Polymeric Material: | Primer 1 | Primer 2 |
|---|---|---|
| Weight Deposited, mg/cm$^2$: | 0.09 | 0.10 |
| Dry Adhesion (a) | 100% | 100% |
| Dry Adhesion (b) | Very Good | Good |
| Wet Adhesion (c) | >60 s | >60 s |
| Wet Adhesion (d) | Pass | Pass |

(a) As described in Example 1.
(b) A "V"-shaped cut was made through the paint and the paint peeled back from the apex of the "V" with a sharp knife. The results reflect a qualitative assessment of the force required to peel the paint.
(c) As described in Example 1. The test was stopped at 60 seconds.
(d) The painted plaque, with an "X" cut in the surface of the paint, was immersed in distilled water for 10 days at 38° C. On removal from the water, the plaque was quickly dried and reinforced pressure sensitive tape pressed over the center of the "X" cut. The tape was then rapidly stripped off. A "Pass" indicated that none of the paint was removed.

It is evident that both primers gave satisfactory levels of adhesion.

II. COMPARISON EXAMPLES USING BENZOPHENONE AND UV RADIATION AS TAUGHT BY CANADIAN PATENT No. 974,928 TO G. A. BASEDEN

Examples 1-3 above were repeated but, instead of using a primer of the present invention, the priming was effected by spraying the plaques with a 5% solution of benzophenone in petroleum naphtha having a boiling range of 120°-140° C. (dry deposition 0.056 mg/cm$^2$); after the solvent had evaporated, the sprayed surfaces were exposed to 1.4 J/cm$^2$ UV radiation in the 200-400 nm range (approximately 0.5 J/cm$^2$ as measured at a wavelength of 365 nm). This was followed by paint application in which the same paint type, dry film thickness, and paint bake cycle was used as in the corresponding examples of Section I. The following results were obtained:

| Polyolefin Composition and Type as Example in Section I | Dry Adhesion, % | Wet Adhesion, s |
|---|---|---|
| 1 | 30 | >180 |
| 2 | 0 | >180 |
| 3 | 0 | <5 |

By comparing the above results with those of Examples 1-3 in Section I, it can be seen that chlorinated polymeric primer treatment followed by ultraviolet radiation according to the present invention is more effective than benzophenone treatment followed by ultraviolet radiation. While results are dramatic for polypropylene blends with EPDM rubber, an improvement can also be seen for polypropylene alone.

III. COMPARISON WITH TRICHLOROETHYLENE AND UV RADIATION AS TAUGHT BY U.S. PATENT 3,619,245 TO R. A. BRAGOLE

Additional plaques identical to those used in Section I, Example 2 above, were primed with trichloroethylene and exposed to UV, as described in U.S. Pat. No. 3,619,246. After the surface of a plaque had been cleaned in a power wash and oven dried, trichloroethylene was brushed onto the surface. A short time afterward (e.g., 1-2 minutes), the surface was exposed to UV radiation of 0.5 J/cm$^2$ at a wavelength of 365 nm. Data supplied by the UV lamp manufacturer (Hanovia Lamp Division, Canrad Precision Industries) indicate that 0.5 J/cm$^2$ at 365 nm is equivalent to an exposure of about 1.43 J/cm$^2$ in the range of 240-400 nm. This lies within the radiation range given in the examples of U.S. Pat. No. 3,619,246. A coating of paint was applied and baked, as described in Example 1 of Section I.

The following test results were obtained:

| Dry Adhesion | Wet Adhesion |
|---|---|
| 20% | <180 s |

When compared with the results of Example 2 in Section I, it is apparent that the level of dry adhesion obtained with this priming procedure was considerably inferior to that obtained by the chlorinated polymeric material/UV priming process of the present invention.

I claim:

1. A process for preparing for painting the surface of an article made of a polyolefin selected from:
   (1) polyethylene, polypropylene, and crystalline dipolymers of ethylene and propylene;
   (2) blends of at least two members of the group recited in (1) above; and
   (3) blends of at least one member of the group recited in (1) above with at least one elastomer selected from the class of ethylene/propylene dipolymers and EPDM copolymers in which the total amount of elastomeric polymers is at most about 50 weight percent of the final polymer blend;

said process comprising the steps of:
   (a) cleaning said surface;
   (b) priming the cleaned surface with a thin layer of a chlorinated polymeric material selected from:
      (1) a chlorinated polypropylene containing about 5-25 weight percent of chlorine and having a number average molecular weight of about 5,000-50,000, and
      (2) a chlorinated polypropylene containing carboxylic anhydride groups and about 5-25 weight percent of chlorine and having a number average molecular weight of about 5,000-50,000; and
   (c) exposing the primed surface to ultraviolet radiation.

2. The process of claim 1 wherein the ultraviolet radiation has a wavelength within the range of about 200-400 nm.

3. The process of claim 2 wherein the ultraviolet energy received by the polyolefin article surface is about 0.1-6.0 J/cm$^2$.

4. The process of claim 3 wherein the ultraviolet energy received by the polyolefin article surface is about 0.2-3.0 J/cm$^2$.

5. The process of claim 1 wherein the polyolefin is a crystalline, impact-resistant, hard grade of ethylene/propylene dipolymer.

6. The process of claim 1 wherein the polyolefin is a blend of polypropylene with an EPDM copolymer.

7. The process of claim 1 wherein the polyolefin is a blend of a crystalline, impact-resistant hard grade of ethylene/propylene dipolymer with an elastomer.

8. The process of claim 1 wherein the amount of dry primer deposited on the polyolefin article surface is about 0.017-1.08 mg/cm$^2$.

9. The process of claim 8 wherein the amount of dry primer is about 0.03-0.2 mg/cm$^2$.

* * * * *